United States Patent [19]

Weible

[11] Patent Number: 4,509,932
[45] Date of Patent: Apr. 9, 1985

[54] DOUBLE CARDAN UNIVERSAL JOINT WITH IMPROVED CENTERING MEANS

[75] Inventor: Warren W. Weible, Defiance, Ohio
[73] Assignee: The Zeller Corporation, Defiance, Ohio
[21] Appl. No.: 501,051
[22] Filed: Jun. 8, 1983

Related U.S. Application Data

[63] Continuation of Ser. No. 254,270, Apr. 15, 1981, abandoned, which is a continuation-in-part of Ser. No. 040,774, May 21, 1979, abandoned.

[51] Int. Cl.³ .............................................. F16D 3/32
[52] U.S. Cl. ..................... 464/109; 74/457; 464/117
[58] Field of Search ............... 464/109, 114, 117, 118, 464/158, 159, 173, 905; 74/457, 462

[56] References Cited

U.S. PATENT DOCUMENTS

| 83,469 | 10/1868 | Crandall | 74/462 |
|---|---|---|---|
| 2,306,854 | 12/1942 | Zimmer | 74/462 |
| 2,553,020 | 5/1951 | Urschel | 464/117 |
| 2,986,022 | 5/1961 | Stokely | 464/173 X |
| 2,987,896 | 6/1961 | Griffith | 464/118 |
| 3,029,618 | 4/1962 | Bouchard et al. | 464/173 X |
| 3,429,144 | 2/1969 | McIntosh | 464/118 |
| 3,747,368 | 7/1973 | Morin | 464/109 |
| 3,857,256 | 12/1974 | Girguis | 464/109 X |
| 4,352,276 | 10/1982 | Smith | 464/109 |

FOREIGN PATENT DOCUMENTS

| 1223632 | 8/1966 | Fed. Rep. of Germany . | |
| 2105751 | 10/1971 | Fed. Rep. of Germany | 464/118 |
| 734764 | 10/1932 | France | 464/118 |
| 994934 | 11/1951 | France | 464/118 |
| 994951 | 11/1951 | France | 464/118 |
| 997928 | 1/1952 | France . | |
| 1093486 | 5/1955 | France | 464/118 |

Primary Examiner—Stuart S. Levy
Assistant Examiner—Daniel P. Stodola
Attorney, Agent, or Firm—Allen D. Gutchess, Jr.

[57] ABSTRACT

A double Cardan universal joint is provided with improved centering members. One end yoke of the joint has circular ridges or teeth and a central tooth facing the other end yoke with the center line of the teeth being coaxial with the axis of rotation of the one yoke. The other end yoke has circular ridges or teeth and a central recess facing the one end yoke with the center line of those teeth and recess being coaxial with the axis of rotation of that yoke. The teeth are positioned so that one tooth extends between two teeth of the other yoke for any position of the end yokes and the drive and driven members or shafts to which they are attached. The sets of teeth are in patterns of spherical segments so that any longitudinal cross section taken centrally through the teeth has the same general appearance as a section gear through a segment. In a preferred form, the tooth profile or shape in transverse section is such that intermediate portions are thicker than both inner and outer end portions. The center tooth is also thicker in transverse cross section than the other teeth and the central recess is wider in transverse cross section than grooves between the teeth.

20 Claims, 8 Drawing Figures

DOUBLE CARDAN UNIVERSAL JOINT WITH IMPROVED CENTERING MEANS

This is a continuation of my application Ser. No. 254,270 filed Apr. 15, 1981, now abandoned, which is a continuation-in-part of my application Ser. No. 040,774, filed May 21, 1979, now abandoned.

This invention relates to a double Cardan universal joint with improved centering means.

Double Cardan universal joints are well known in the art and have the advantage of producing constant velocity between the drive and driven members or shafts which they connect. A double Cardan universal joint includes a first end yoke connected to a drive member or shaft and having two arms rotatably receiving two opposite trunnions of a first cross. A second end yoke is connected to a driven member or shaft and has two arms rotatably receiving two opposite trunnions of a second cross. A connecting yoke extends between the end yokes and has arms receiving opposite trunnions of both crosses, the latter trunnions being mutually perpendicular to the trunnions received in the arms of the end yokes.

In order to provide constant velocity between the drive and driven shafts, it is essential that their angles of displacement, when out of alignment, be equal. Stated another way, the angles formed between the axes of rotation of the shafts and the axis of rotation of the connecting yoke must be equal. To accomplish this, centering means are provided between the two end yokes and located within the connecting yoke. Heretofore, such centering means usually have been in a form of a socket carried by one end yoke and a ball extending into the socket and carried by the other end yoke. To achieve true constant velocity, the point of engagement of the ball and socket must be equally spaced from the axes of the cross trunnions held by the arms of the connecting yoke.

With the centering means heretofore employed, the components thereof must necessarily move apart as the drive and driven shafts move out of alignment to angular positions. The greater the angle, the more the components separate. With a ball and socket centering device, for example, the ball moves outwardly relative to the socket with the result that the point of contact or engagement therebetween no longer is equally spaced from the aforesaid trunnion axes. As a result, the angles of displacement of the drive and driven shafts are no longer precisely equal and, consequently, precise constant velocity is not achieved between the drive and driven shafts.

The present invention provides a double Cardan universal joint with centering means, the components of which are always engaged equally from the axes of the trunnions carried by the connecting yoke. Accordingly, one end yoke has first ridges or teeth facing the other end yoke with the center line of the teeth being coaxial with the axis of rotation of the one yoke and the drive or driven shaft to which it is connected. Similarly, the other end yoke has second ridges or teeth facing the one end yoke with the center line of those teeth being coaxial with the axis of rotation of the other yoke and the drive or driven shaft to which it is connected. The sets of teeth are displaced one-half teeth for any position of the end yokes and the drive and driven shafts. The teeth are also positioned in spherical segment or arcuate patterns, the centers of which are located at the intersections of the axes of the trunnions of the two crosses. Thus, any longitudinal cross section taken centrally through the teeth appears generally the same as a section through a gear segment. The teeth are of a profile or shape such that the effective points of engagement therebetween are on the pitch radii, at the intersection with a line taken through the centers of the sets of teeth, such a profile being generally involute or other similar shape. However, the shape of the teeth preferably is such that intermediate portions are thicker than end portions, as viewed in transverse cross section. Also, a central tooth of the one yoke is thicker than an adjacent circular tooth, as viewed in transverse cross section, and a central recess of the other yoke is wider than a circular groove, as viewed in transverse cross section, between adjacent circular teeth.

The new centering means not only provides constant velocity between the drive and driven shafts but also provides more of a rolling contact and less of a sliding contact so that less frictional loss and probably less wear will result. The centering means also enables the crosses of the double Cardan joint to be closer together to achieve greater angularity. Further, there are no moving parts in the new centering device.

It is, therefore, a principal object of the invention to provide a double Cardan universal joint with improved centering means.

Another object of the invention is to provide a double Cardan universal joint achieving more precise constant velocity between drive and driven members which are connected by the joint.

Still another object of the invention is to provide a double Cardan universal joint with centering means in the form of circular teeth which are thicker at intermediate portions than at both end portions, and circular grooves which are narrower at intermediate portions than at both end portions, as viewed in transverse cross section.

Still a further object of the invention is to provide a double Cardan universal joint with one centering member having a circular tooth and a central tooth which is thicker than the circular tooth and another centering member with a circular groove and a central recess which is wider than the circular groove, as viewed in transverse cross section.

Yet a further object of the invention is to provide a universal joint with centering means having less frictional loss and wear.

Many other objects and advantages of the invention will be apparent from the following detailed description of preferred embodiments thereof, reference being made to the accompanying drawings, in which.

Figure 1:
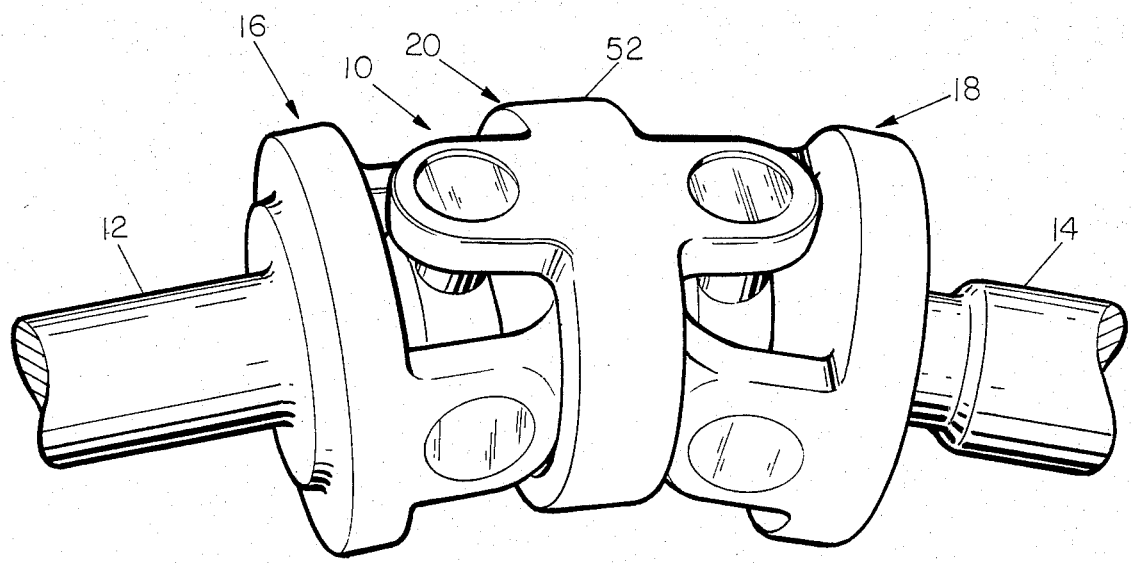
FIG. 1 is a view in perspective of a double Cardan universal joint embodying the invention.

Referring to the drawings, and particularly to FIG. 1, a double Cardan universal joint embodying the invention is indicated at 10 and connects drive and driven shafts or members 12 and 14. The universal joint 10 includes a first end yoke 16, a second end yoke 18, and a connecting yoke or member 20.

In this instance, the first end yoke 16 has a base or flange 22 which is affixed directly to the shaft 12. However, the flange 22 can be separate and bolted to a flange on the shaft 12, if desired. A pair of arms 24 and 26 extend from the flange 22 and have bearing cups 28 and 30 mounted therein and held by retaining rings 32. A first cross 34 has opposite trunnions 36 and 38 rotatably held by the yoke arms 24 and 26. Specifically, the trunnions 36 and 38 are received in the bearing cups 28 and 30 which contain needle bearings 40 and have seals 42, as usual.

The cross 34 also has two opposite trunnions 44 and 46 which are mutually perpendicular to the trunnions 36 and 38 and also have an axis of rotation which is mutually perpendicular to an axis of rotation of the trunnions 36 and 38. The trunnions 44 and 46 are rotatably received in arms 48 and 50 of the connecting yoke 20, the arms extending from a common ring 52 of the connecting yoke 20. Specifically, the trunnions 44 and 46 are held in bearing cups 54 and 56, again having the needle bearings 40 and the seals 42.

At the opposite end, the connecting yoke 20 has arms 58 and 60 having bearing cups 62 and 64 with the usual needle bearings 40 and the seals 42. The arms rotatably receive trunnions 66 and 68 of a second cross 70, the trunnions rotating on an axis parallel to the axis of the trunnions 44 and 46 of the first cross 34.

The second cross 70 also has opposite trunnions 72 and 74 which are mutually perpendicular to the trunnions 66 and 68 and have mutually perpendicular axes of rotation. These trunnions are rotatably held in bearing cups 76 and 78 having the needle bearings 40 and the seals 42, with the cups received in arms 80 and 82 extending from a base or flange 84 of the second end yoke 18. Like the flange 22, the flange 84 can be affixed directly to the shaft 14 or it can be bolted to a separate flange on the shaft 14.

For the double Cardan joint 10 to achieve constant velocity between the drive and driven shafts 12 and 14, the angle of displacement of the shafts must be equal. More specifically, the axis of rotation of the shaft 12 must form an angle with the axis of rotation of the connecting yoke, or a line drawn through the intersections of the axes of rotation of the trunnions of the first cross 34 and of the second cross 36, which angle is equal to the angle formed by the axis of rotation of the shaft 14 with the same axis or line. Stated another way, the connecting yoke must rotate on an axis which is perpendicular to a plane which bisects the angle formed by the two shafts. To maintain the equal angular relationship and the constant velocity, centering means indicated at 86 is provided. Accordingly, an arcuate bridging member or web 88 extends from the ends of the arms 24 and 26 of the end yoke 16, being cast integrally with the arms. A similar bridging member or web 90 similarly extends from the ends of the arms 80 and 82 of the end yoke 18. A replaceable centering member 92 has a threaded shank 94 (FIG. 4) received in a threaded opening 96 in the web 88 and a centering member 98 similarly has a threaded shank 100 received in an opening 102 in the web 90.

A plurality of circular ridges or teeth 104 and 106 are formed on the member 92, there being two circular teeth in this instance. An outer circular groove 108 is formed between them and a central tooth 110 is located within an inner circular groove 112.

Circular ridges or teeth 114 and 116 are also formed on the member 98, with an outer tooth 118 being a partial one. A circular outer groove 120 is formed between the teeth 116 and 118 and a circular inner groove 122 is formed between the teeth 114 and 116. A central recess 124 which receives the central tooth 110 is formed within the tooth 116.

The circular teeth of the member 92 are offset one-half tooth from the teeth of the member 98 so that they can intermesh similar to teeth of conventional gears. The teeth have an involute profile or shape in cross section, or other suitable profile, with the teeth of one member engaging the teeth of the other member substantially on lines of action which intersect on a line extending through the intersections of the trunnion rotational axes of the crosses 34 and 70. The pitch radius of the teeth 102, 106, and 110 have the center at the intersection of the axes of rotation of the trunnions 44 and 46 and the pitch radius of the teeth 114, 116, and 118 have the center at the intersection of the axes of rotation of the trunnions 66 and 68. The teeth may not engage exactly in the above manner, depending on the degree of precision in the machining of the teeth.

The teeth on each centering member are formed in the pattern or configuration of a segment of a sphere, the center of which coincides with the intersection of the axes of rotation of the trunnions of the respective cross 34 or 70. In this manner, the point of effective engagement of the teeth, where the lines of action intersect, will always be equi-distant from the aforesaid axes of rotation. This assures that the angles of displacement of the rotational axes of the shafts 12 and 14 will always be equal and that the shafts will rotate with precise constant velocity. This centering design also takes less room so that the crosses can be closer together. Not only is the universal joint thus more compact but the shafts can rotate with greater angularity, about 45° versus 18°, for example.

In addition, the teeth engage with a rolling motion and essentially no sliding motion to reduce frictional loss and probably result in less wear. Finally, the centering means has no moving parts.

The centering means 88 can be equipped with a grease boot or enclosure 126, if desired. This has two spaced bands 128 and 130 which are received in annular grooves 132 and 134 in the peripheries of the centering members 92 and 98.

Figure 7:
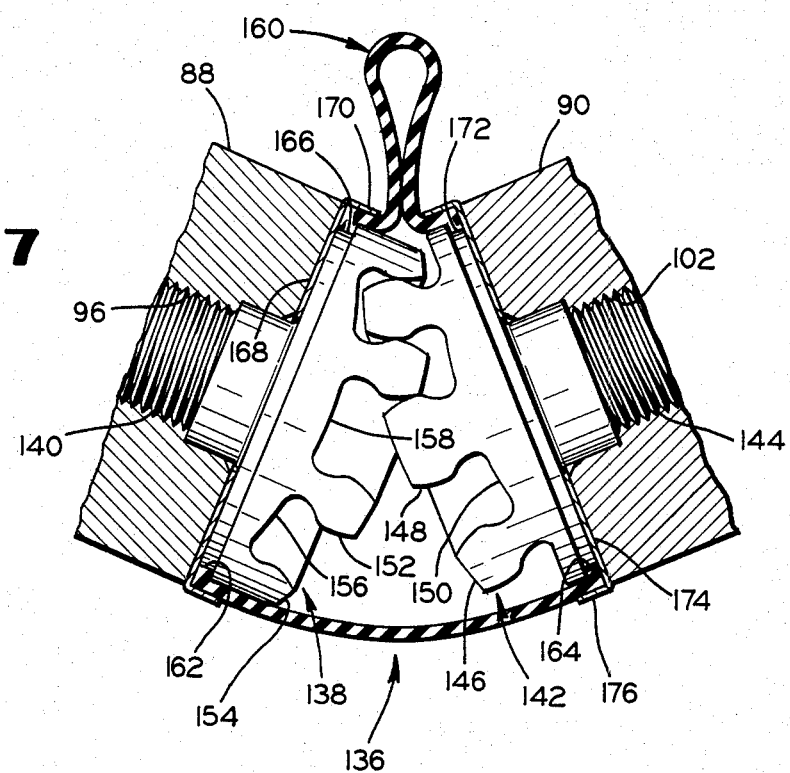
FIG. 7 is a view similar to FIG. 4 of a modified centering means of the universal joint.

Modified centering means is indicated at 136 in FIG. 7. The centering means differs most significantly from the centering means 86 in the shape of the teeth or ridges and in the difference between the sizes, as viewed in section, of the center tooth and recess as compared to the circular teeth and grooves. A centering member 138 can be formed in the web 88 but preferably is replaceable. In such an instance, the centering member can have a shank 140 which can be press-fit in a bore in the web 88 or can be threaded, as shown, and turned into the threaded opening 96 in the web 88. A centering member 142 similarly can be formed in the web 90 but preferably is replaceable. In such an instance, the centering member 142 can have a shank 144 which can be press-fit in a bore in the web 90 or can be threaded, as shown, and turned into the threaded opening 102 in the web 90. The threaded shanks 140 and 144 can also extend through the openings 96 and 102 and be affixed by nuts behind the webs 88 and 90. As is also true of the centering members 92 and 98, the centering members 138 and 142 can then be removed and replaced without the necessity of replacing the entire double Cardan joint 10.

The centering member 142 has a circular ridge or tooth 146 formed thereon with a central, thicker tooth 148 and a circular groove 150 therebetween. The centering member 138 has a circular ridge or tooth 152 formed thereon with an outer, partial circular tooth or ridge 154. A circular groove 156 is formed between the teeth 152 and 154 and a central recess 158 is formed within the circular tooth 152 and receives the central tooth 148.

The teeth 146, 148, 152 and 154 are positioned on a spherical segment with centers at the points where the axes of the trunnions of the crosses intersect, as is the case with the teeth 102, 106, 110, 114, 116 and 118.

The teeth of the members 138 and 142 are offset one-half tooth so that they can intermesh in a manner generally similar to the teeth of conventional gears. However, the teeth have shapes which are significantly different than the shapes of conventional gears. The circular teeth 146 and 152 as well as the central tooth 148 all have intermediate portions which are thicker than the inner and outer end portions at the bottom and top lands of the teeth. The inner end portions of the teeth also are undercut relative to the intermediate portions. Similarly, the intermediate portions of the circular grooves 150 and 156 and the recess 158 are narrower than the bottoms and tops of the grooves and recess. When the outer portions of the teeth 146, 148, and 152 are of involute or epicycloidal shape, the base circle from which the shape is formed has a radius which is from zero to one-fourth of the tooth height less than the radius of the pitch circle, with the teeth being undercut from the base circle to the root circle. The undercuts in the circular teeth can be substantial without unduly weakening the teeth, because of the circular or ring shape of them. Usually with this shape, the inner surfaces of the teeth between the base and root circles will not be contacted, at least to any extent, by other teeth. The undercut inner portions of the teeth primarily constitute connecting mounts to extend outwardly the outer portions of the teeth so that the base circle is spaced outwardly from the root circle and located at or near the pitch circle.

An advantage of the particuar shapes of the teeth, grooves, and recess is in the fact that the centering means 136 can perform satisfactorily even with relatively large tolerances in other components of the double Cardan joint which cause the spacing between the centering members 138 and 142 to vary. Thus, variations will exist between the spacing of the bearing cups in the connecting yoke, in the concentricity or eccentricity of the trunnions and in the bearing cups themselves, and in the spacing of the bearing cups in the end yokes. Variation in the spacing of the back of the centering members to the pitch line of the teeth can also exist. Of course, the tolerances can be cumulative or be offsetting. However, with the particular shape of teeth, grooves, and recesses employed, such tolerances can be tolerated, even if cumulative. With teeth having a conventional involute profile or shape in cross section, as in FIG. 4, individual shims may be required between the bridging members and centering members to accommodate the spacing variations. This requires additional parts and, in particular, additional labor.

The involute shape of the upper portions teeth enables the centering means 136 to perform satisfactorily under greater tolerance variations in assembly dimensions but results in some deviation from true constant velocity of the shafts. The epicycloidal shape of the upper portions of the teeth provides precise constant velocity but with somewhat less tolerance in dimensional variations. Tooth shapes approximating the involute shape or the epicycloidal shape can be used as well as the shapes which are between the involute and epicycloidal ones. Such shapes of the upper portion of the teeth above the base circle, located at an intermediate portion of the teeth are generically referred to herein as conventional gear tooth shapes.

Figure 8:
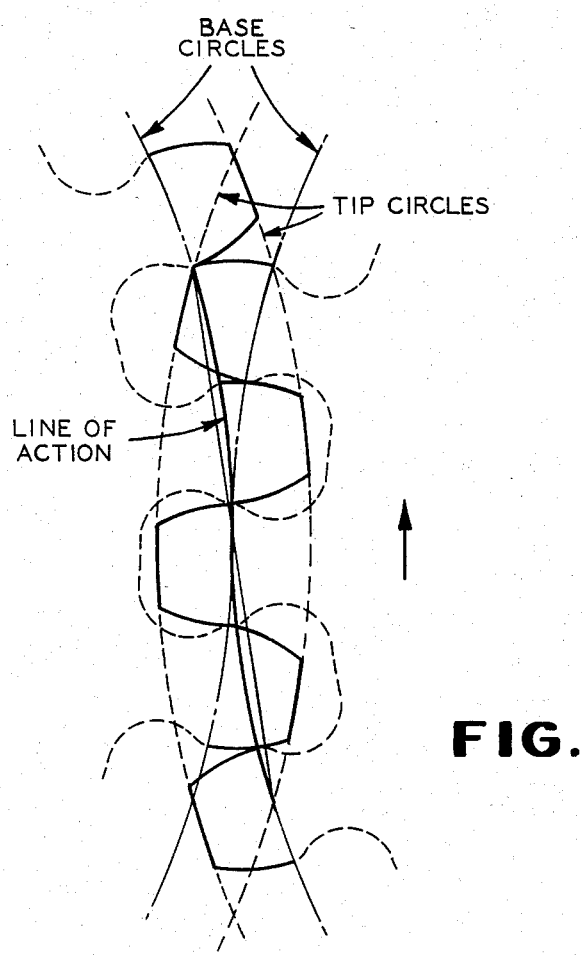
FIG. 8 is a diagrammatic view showing two teeth of the centering means of FIG. 7 in several positions.

Referring particularly to FIG. 8, the centering means and specifically the centering members 138 and 142 are meshed and the teeth are spaced so that the base lines of the centering members are touching at the axis between the centers of the two centering members. The base of one tooth will be touching the base of the opposite tooth at the base line when they are on the aforesaid axis. When the centering members are moved out of axial alignment in one direction, the base of the first tooth will slide along the outer surface of the second tooth beyond the base line until the tip is reached, at which point separation of the teeth occurs. This point is where the tip circle of the one centering member and the base circle of the other intersect. Similarly, starting at the axis between the centers, if the centering members are moved out of axial alignment in the opposite direction, the base of the second tooth slides along the outer surface of the first tooth beyond the base line until the tip is reached. However, it should be noted that there is substantially no sliding action between the surfaces of the teeth in the normal rotation of the universal joints, but only when the angles are changed. Actually, some deflection in the teeth occurs with some sliding contact resulting but this is relatively minor, particularly as compared to a ball-type centering device which has extensive sliding contact with the rotation of the universal joint.

With conventional gear teeth of involute shape, the line of action is tangential to the two base circles of the two gears. With the shape of the teeth of FIG. 7, however, the line of action is closer to a line perpendicular to a line between the centers of the gears with the pressure angle approaching zero and being only about half the pressure angle of the line of action of conventional involute shaped teeth. This smaller pressure angle, in particular, enables the centering members of FIG. 7 to function satisfactorily with greater tolerances in the universal joint. As illustrated in FIG. 8, the pressure angle of the line of action is small, the line of action being between the point where the base circle of one centering member intersects the tip or addendum circle of the second centering member and where the base circle of the second centering member intersects the tip circle of the one centering member. Actually, the line of action in this instance is not a truly straight line but, rather, follows the base circle on one side of the center line between the centers of the centering members and then follows the other base circle on the other side of the center line, resulting in a shallow S-shaped configuration for the line.

With centering devices using teeth of conventional involute shape, when the joints are articulated at high angles, for example, forty-five degrees, the faces of the teeth separate rapidly from the contacting points around the circular tooth form. Consequently, large deflections in the teeth are required to resist the transverse forces tending to move the centering members out of alignment and unsatisfactory life can result. However, with the tooth shape under consideration with the outer shape being generally of a conventional gear tooth shape and with the undercut, closer cooperation of the gear teeth results with the teeth surfaces tending to separate less rapidly at greater angles for the joints. Consequently, reduced deflection in the teeth can still enable them to resist transverse forces tending to move the centering members out of alignment. This smaller deflection of the teeth increases the life thereof.

The points of contact between the teeth of the centering members normally lie in the common plane defined by the two axes of the shafts and will tend to slide rather than resist forces acting at right angles to the common plane. Forces at less than right angles will cause partial resistance and partial sliding, depending upon the direction of the forces involved. The centering members and specifically the teeth thereof, must deflect slightly to resist these forces, thereby causing the contacting faces to move out of the common plane. The particular tooth design enables the centering member to resist forces tending to move the two shafts out of alignment more effectively, particularly when the forces are acting at angles to the plane formed by the axes of the two shafts.

Figure 4:
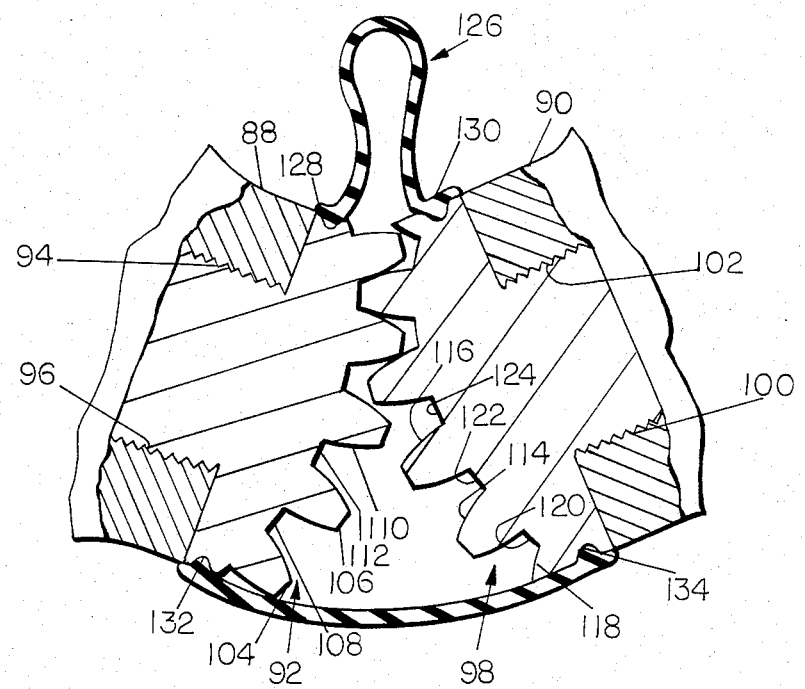
FIG. 4 is an enlarged, fragmentary view in cross section of centering means of the universal joint.
Figure 2:
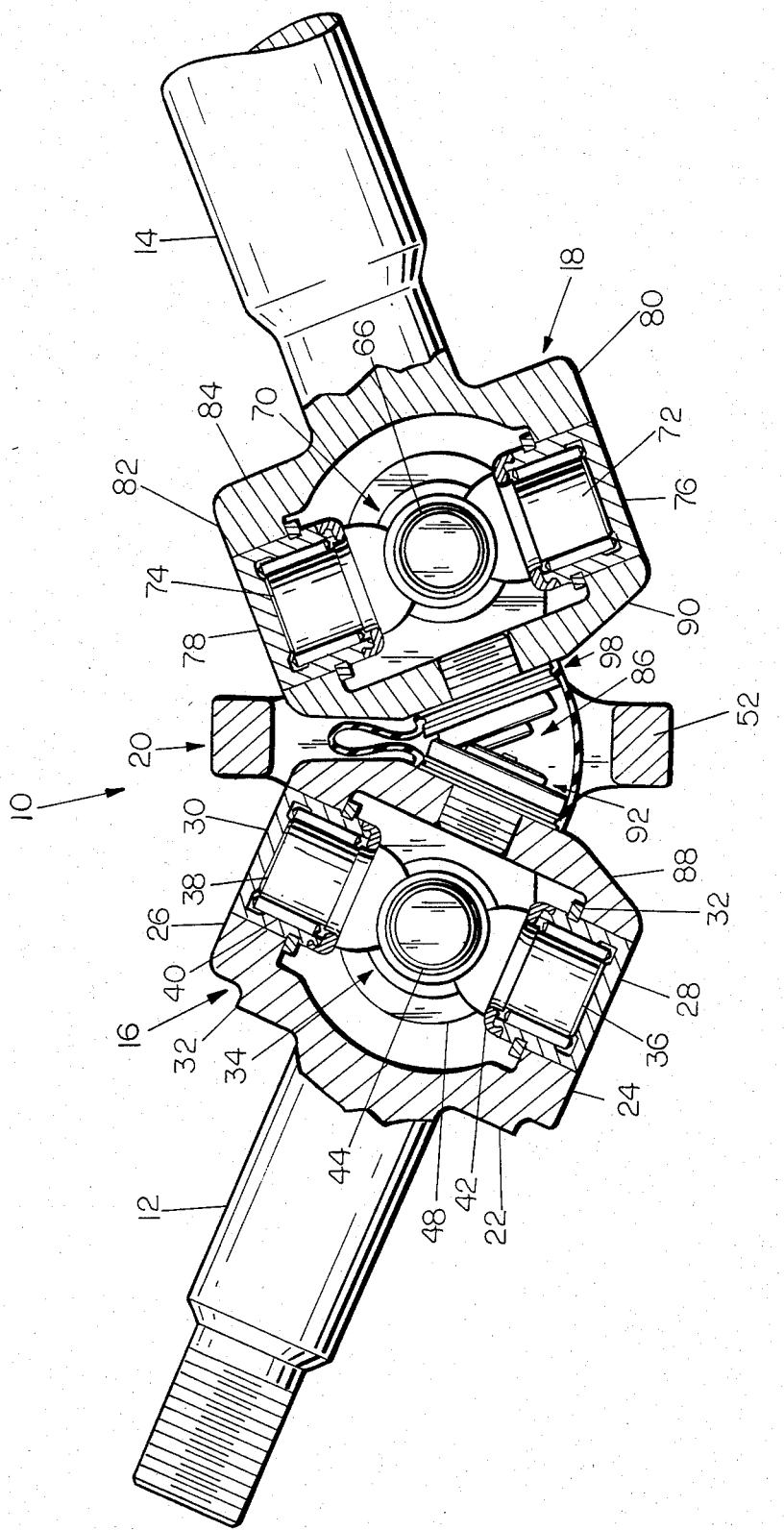
FIG. 2 is a side view, with parts broken away and with parts in section, of the universal joint of FIG. 1.
Figure 3:
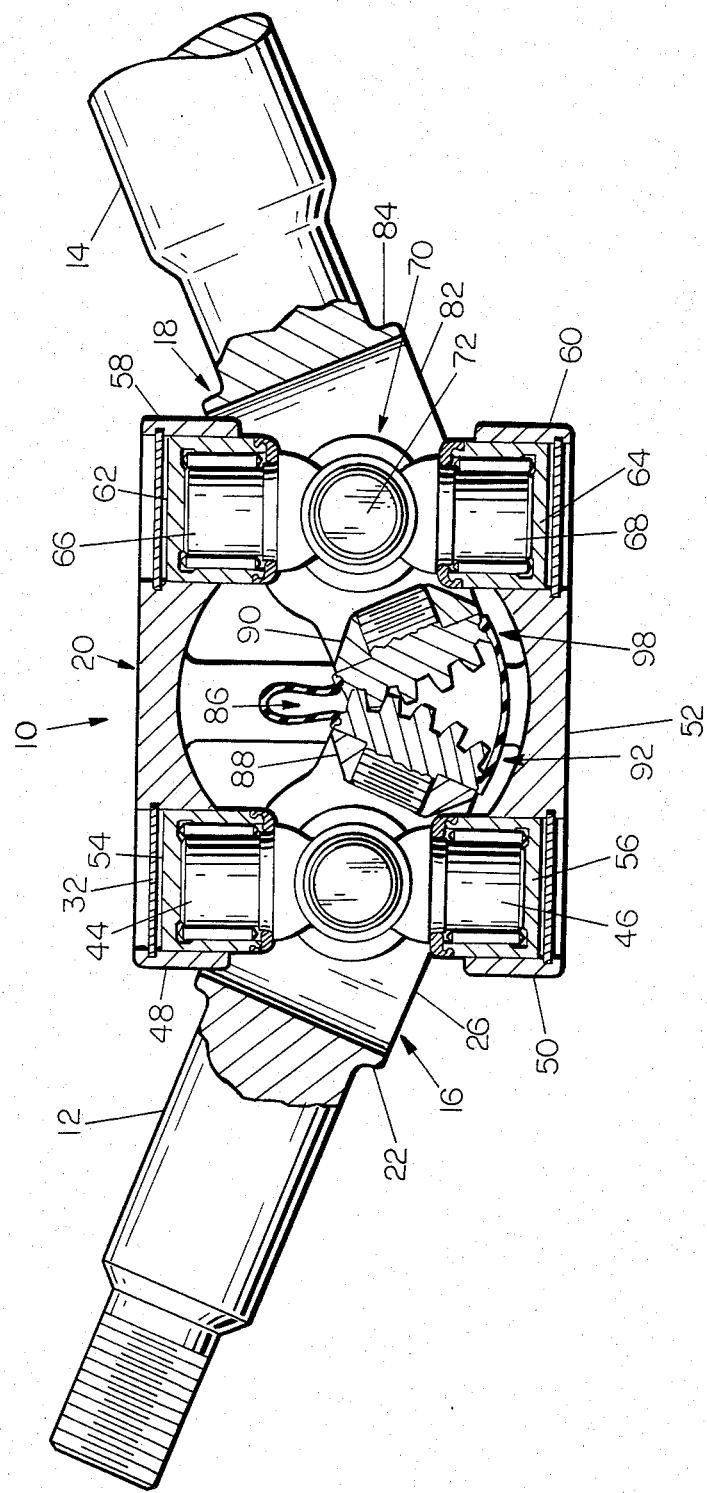
FIG. 3 is a view similar to FIG. 2 with the universal joint rotated ninety degrees.
Figure 6:
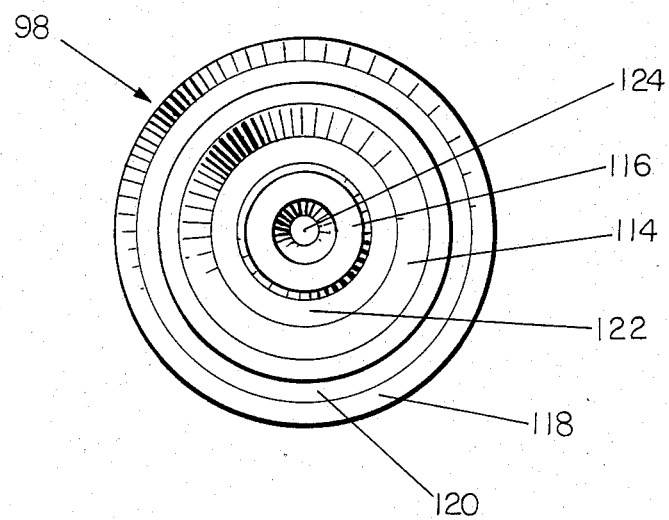
FIGS. 5 and 6 are enlarged face views of centering components of the universal joint.
Figure 5:
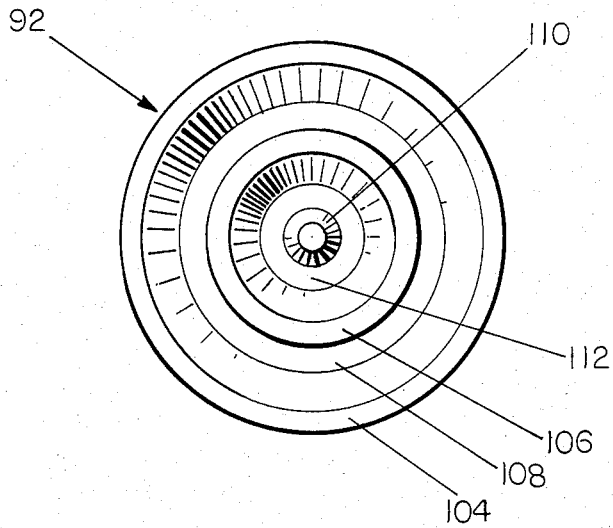

It also has actually been found that the particular shapes of the teeth, grooves, and recess enable the centering members to be more easily made than the shapes of the teeth of the centering members of FIG. 4, for example. The teeth, grooves, and recesses can be formed on the centering members of FIGS. 4 and 7 by cutters in the shape of gear racks. Each rack is pivoted about its pitch line along the pitch line of the centering member. With the teeth of the centering members 138 and 142 of FIG. 7, the gear rack teeth can have side surfaces perpendicular to the pitch line of the rack from the bottom land to the pitch line. The upper surfaces from the pitch line to the top land of the teeth can have a fifteen degree taper relative to the lower surfaces, by way of illustration.

The centering means 136 preferably is equipped with a grease boot or enclosure 160. This has two spaced bands 162 and 164 held by the centering members 138 and 142. For this purpose, the first centering member 138 has an end groove or offset 166 with an adjacent retaining plate 168 located between the centering member 138 and the bridging member 88. The retaining plate has a peripheral flange 170 which is concentric with the centering member 138 and cooperates with the groove 166 to hold the band 162 in place. Similarly, the centering member 142 has an end groove or annular recess 172 with an adjacent retaining plate 174 located between the centering member 142 and the bridging member 90. The retaining plate 174 also has a peripheral flange 176 to hold the band 164 of the boot 160 in position.

Various modifications of the above-described embodiments of the invention will be apparent to those skilled in the art and it is to be understood that such modifications can be made without departing from the scope of the invention, the embodiments shown and described being primarily for purposes of illustration and not limitation.

I claim:

1. In a double Cardan type universal joint for connecting two shafts, said universal joint comprising a first end yoke, a second end yoke, a connecting yoke between said first end yoke and said second end yoke, a first cross having two aligned trunnions rotatably held by said first end yoke and having two additional aligned trunnions rotatably held by said connecting yoke, a second cross having two aligned trunnions rotatably held by said second end yoke and having two additional aligned trunnions rotatably held by said connecting yoke, and centering means between said first yoke and said second yoke, the improvement comprising said centering means being at least one first circular tooth and a central tooth which is thicker in transverse cross section than the circular tooth with a first circular groove therebetween, said teeth and groove being carried by said first end yoke and located on a center line coaxial with the axis of rotation of said first end yoke, said teeth and groove also being disposed in the shape of a segment of a sphere with the center being on the point where the axes of the trunnions of said first cross intersect, and second circular teeth, a second circular groove therebetween, and a central recess which is wider in transverse cross section than said second groove, said second teeth, said second groove, and said recess being carried by said second end yoke and located on a center line coaxial with the axis of rotation of said second end yoke and being disposed in the shape of a segment of a sphere with the center being on the point where the axes of the trunnions of said second cross intersect, outer portions of said teeth having generally involute profiles, said involute profiles being formed on base circles having radii which are from zero to 25% of the tooth height less than the radii of pitch circles of the teeth.

2. The improvement according to claim 1 characterized by inner portions of said teeth inside the base circles being undercut.

3. The improvement according to claim 1 characterized by said teeth having a pitch angle and having shapes such that the pitch angle is less than the pitch angle of gears with conventional teeth of involute shape.

4. In a double Cardan type universal joint for connecting two shafts, said universal joint comprising a first end yoke, a second end yoke, a connecting yoke between said first end yoke and said second end yoke, a first cross having two aligned trunnions rotatably held by said first end yoke and having two additional aligned trunnions rotatably held by said connecting yoke, a second cross having two aligned trunnions rotatably held by said second end yoke and having two additional aligned trunnions rotatably held by said connecting yoke, and centering means between said first yoke and said second yoke, the improvement comprising said centering means being a first circular ridge, a first circular groove, and a central tooth formed on a first bridging member carried by said first end yoke, said ridge, groove and tooth being located on a center line coaxial with the axis of rotation of said first end yoke, said central tooth being thicker than said first circular ridge in transverse cross section, and a second circular ridge, a second circular groove, and a central recess formed on a second bridging member carried by said second end yoke, said second ridge, groove, and recess being located on a center line coaxial with the axis of rotation of said second end yoke, said central recess being wider than the second groove in transverse cross section, said first ridge being thicker at an intermediate portion than at both inner and outer end portions in transverse cross section, said first groove being thinner at an intermediate portion than at both inner and outer end portions in transverse cross section, and said second ridge being thicker at an intermediate portion than at both inner and outer end portions in transverse cross section, said second groove being thinner at an intermediate portion than at both inner and outer end portions in transverse cross section, said first circular ridge, said first circular groove, and said tooth being formed on a first centering member which is removably mounted on said first bridging member and said second circular ridge, said second circular groove, and said recess being formed on a second centering member which is removably mounted on said second bridging member, said centering members having circular grooves adjacent the respective bridging members, a boot having structurally integral end bands held by said last-named grooves, and plates positioned between said centering members and the respective bridging members, said plates having circular flanges adjacent said last-named grooves to aid in holding said boot bands in place.

5. The improvement according to claim 4 characterized by said outer portions of said ridges having generally involute profiles.

6. The improvement according to claim 5 characterized by the inner portions of said ridges being undercut.

7. In a double Cardan type universal joint for connecting two shafts, said universal joint comprising a first end yoke, a second end yoke, a connecting yoke between said first end yoke and said second end yoke, a first cross having two aligned trunnions rotatably held by said first end yoke and having two additional aligned trunnions rotatably held by said connecting yoke, a second cross having two aligned trunnions rotatably held by said second end yoke and having two aligned trunnions rotatably held by said connecting yoke, and centering means between said first yoke and said second yoke, the improvement comprising said centering means being a first circular ridge and a first circular groove formed on a first bridging member carried by said first end yoke, said ridge and groove being located on a center line coaxial with the axis of rotation of said first end yoke, said first ridge being thicker at an intermediate portion than at an outer end portion and being no thinner at the intermediate portion than at an inner end portion in transverse cross section, said first groove being narrower at an intermediate portion than at an outer end portion and being no wider at the intermediate portion than at an inner end portion in transverse cross section, and a second circular ridge and a second circular groove formed on a second bridging member carried by said second end yoke, said second ridge and groove being located on a center line coaxial with the axis of rotation of said second end yoke, said second ridge being thicker at an intermediate portion than at an outer end portion and being no thinner at the intermediate portion than at an inner end portion in transverse cross section, said second groove being narrower at an intermediate portion than at an outer end portion and being no wider at the intermediate portion than at an inner end portion in transverse cross section, said outer portions of said ridges having shapes similar to conventional gear tooth shapes and said inner portions of said ridges positioning said outer portions of said ridges with base circles near pitch circles thereof, a central tooth on said first bridging member which is thicker than the first circular ridge thereon in transverse cross section, and a central recess on said second bridging member which is wider than the second groove on the second bridging member in transverse cross section, said central tooth being thicker at an intermediate portion than at an outer end portion and being no thinner at the intermediate portion that at an inner end portion in transverse cross section, and said recess being narrower at an intermediate portion than at an outer end portion and being no wider at the intermediate portion than at an inner end portion in transverse cross section.

8. The improvement according to claim 7 characterized by said base circles having radii which are from zero to twenty-five percent of the ridge height less than the radii of the pitch circles.

9. The improvement according to claim 7 characterized by said outer portions of said ridges having involute shapes and said inner portions of said ridges being undercut and positioning said outer portions of said ridges with base circles near pitch circles.

10. The improvement according to claim 7 characterized by said outer portions of said ridges having epicycloidal shapes and said inner portions of said ridges being undercut and positioning said outer portions of said ridges with base circles near pitch circles.

11. The improvement according to claim 7 characterized by said first circular ridge and said circular groove being formed on a first centering member, said centering member having a threaded shank which is received in a threaded bore in said first bridging member so as to be removably mounted thereon, said second circular ridge and said second circular groove being formed on a second centering member which has a second threaded shank received in a second threaded bore in the second bridging member so as to be removably mounted thereon, said centering members having circular grooves adjacent the respective bridging members, a boot having structurally integral end bands held by said last-named grooves, and plates positioned between said centering members and the respective bridging members, said plates having circular flanges adjacent said last-named grooves to aid in holding said boot bands in place.

12. The improvement according to claim 1 characterized by said first and second bridging members being spaced apart a distance such that the base circles substantially touch on a line between the center of said first circular ridge and first circular groove and the center of said second circular ridge and second circular groove.

13. The improvement according to claim 12 characterized by the pitch of said ridges being such that the intermediate portions thereof are in contact when on a line drawn between the center of said first circular ridge and first circular groove and the center of said second circular ridge and second circular groove.

14. In a double Cardan type universal joint for connecting two shafts, said universal joint comprising a first end yoke, a second end yoke, a connecting yoke between said first end yoke and said second end yoke, a first cross having two aligned trunnions rotatably held by said first end yoke and having two additional aligned trunnions rotatably held by said connecting yoke, a second cross having two aligned trunnions rotatably held by said second end yoke and having two additional aligned trunnions rotatably held by said connecting yoke, and centering means between said first yoke and said second yoke, the improvement comprising said centering means being at least one first circular tooth and a central tooth with a first circular groove therebetween carried by said first end yoke and located on a center line coaxial with the axis of rotation of said first end yoke, said teeth and groove also being disposed in the shape of a segment of a sphere with the center being on the point where the axes of the trunnions of said first cross intersect, said central tooth being thicker than said first circular tooth in transverse cross section, said first circular tooth and said central tooth being thicker at intermediate portions than at outer end portions and being no thinner at the intermediate portions than at inner end portions in transverse cross section, said first circular groove being narrower at an intermediate portion than at an outer end portion and being no wider at the intermediate portion than at an inner end portion in transverse cross section, and second circular teeth, a second circular groove therebetween, and a central recess carried by said second end yoke and located on a center line coaxial with the axis of rotation of said second end yoke and being disposed in the shape of a segment of a sphere with the center being on the point where the axes of the trunnions of said second cross intersect, said central recess being wider than said second circular groove in transverse cross section, said second circular teeth being thicker at intermediate portions than at outer end portions and and being no thinner at the intermediate portions than at inner end portions in transverse cross section, said second circular groove and said central recess being narrower at intermediate portions than at outer end portions and being no wider at the intermediate portions than at inner end portions in transverse cross section, said outer end portions of said teeth being of conventional gear tooth shapes and said inner end portions of said teeth positioning the outer end portions with the base circles near the pitch circles.

15. The improvement according to claim 14 characterized by said outer end portions of said teeth being of involute shape and said inner end portions of said teeth being undercut.

16. The improvement according to claim 15 characterized by said involute shapes being formed on base circles having radii which are from zero to 25% of the tooth height less than the radii of pitch circles of the teeth.

17. The improvement according to claim 14 characterized by said outer end portions of said teeth being of epicycloidal shape and said inner end portions of said teeth being undercut.

18. The improvement according to claim 14 characterized by said end yokes being spaced apart a distance such that the base circles substantially touch on a line between the point where the axes of the trunnions of said first cross intersect and the point where the axes of the trunnions of said second cross intersect.

19. The improvement according to claim 18 characterized by the pitch of said teeth being such that the bases of the teeth are in contact when on a line between the point where the axes of the trunnions of said first cross intersect and the point where the axes of the trunnions of said second cross intersect.

20. The improvement according to claim 14 characterized by said teeth having a pitch angle and having shapes such that the pitch angle is less than the pitch angle of gears with conventional teeth of involute shape.

* * * * *

UNITED STATES PATENT OFFICE
CERTIFICATE OF CORRECTION

PATENT NO. : 4,509,932
DATED : April 9, 1985
INVENTOR(S) : Warren W. Weible

It is certified that error appears in the above-identified patent and that said Letters Patent are hereby corrected as shown below:

Claim 12, line 1, "1" should be --7--.

Signed and Sealed this

Twenty-seventh Day of August 1985

[SEAL]

Attest:

DONALD J. QUIGG

Attesting Officer

Acting Commissioner of Patents and Trademarks